US009909853B2

(12) United States Patent
Roesner et al.

(10) Patent No.: US 9,909,853 B2
(45) Date of Patent: Mar. 6, 2018

(54) CALIBRATION AND MONITORING OF AN ANGLE MEASURING SYSTEM FOR ELECTRICAL MACHINES

(71) Applicant: ROBERT BOSCH GMBH, Stuttgart (DE)

(72) Inventors: Julian Roesner, Untergruppenbach (DE); Mario Kaepple, Oehringen (DE); Paul Mehringer, Stuttgart (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 733 days.

(21) Appl. No.: 14/380,637

(22) PCT Filed: Jan. 24, 2013

(86) PCT No.: PCT/EP2013/051280
§ 371 (c)(1),
(2) Date: Aug. 22, 2014

(87) PCT Pub. No.: WO2013/124113
PCT Pub. Date: Aug. 29, 2013

(65) Prior Publication Data
US 2015/0035520 A1    Feb. 5, 2015

(30) Foreign Application Priority Data

Feb. 23, 2012   (DE) .................. 10 2012 202 772

(51) Int. Cl.
*G01B 7/30*    (2006.01)
*G01B 7/00*    (2006.01)
(Continued)

(52) U.S. Cl.
CPC .............. *G01B 7/003* (2013.01); *G01B 7/30* (2013.01); *G01D 5/2073* (2013.01);
(Continued)

(58) Field of Classification Search
CPC .......... H02P 6/16; H02P 25/03; G01B 7/003; G01B 7/30
(Continued)

(56) References Cited

U.S. PATENT DOCUMENTS 5,569,995 A * 10/1996 Kusaka ............... B60L 11/1807
318/717
6,683,774 B2 * 1/2004 Kameya ................ B62D 5/046
318/139
(Continued)

FOREIGN PATENT DOCUMENTS

CN    1287708 A    3/2001
CN    1365536 A    8/2002
(Continued)

OTHER PUBLICATIONS

International Search Report for PCT/EP2013/051280, dated Jul. 10, 2013.

*Primary Examiner* — Kawing Chan
(74) *Attorney, Agent, or Firm* — Norton Rose Fulbright US LLP; Gerard Messina

(57) ABSTRACT

An electrical machine includes an angular position transducer for identifying a first rotation angle of a rotor; a stator winding for generating a magnetic field; a voltage measuring instrument for sensing a pole wheel voltage at the ends of the stator winding upon a rotation of the rotor; and an identification circuit for identifying a second rotation angle from the pole wheel voltage and for identifying an angle difference between the first and the second rotation angle.

13 Claims, 4 Drawing Sheets

(51) Int. Cl.
    *G01D 5/20*       (2006.01)
    *G01D 18/00*     (2006.01)
    *H02P 6/16*       (2016.01)
    *H02P 25/03*     (2016.01)

(52) U.S. Cl.
    CPC ............ *G01D 18/008* (2013.01); *H02P 6/16* (2013.01); *H02P 25/03* (2016.02)

(58) Field of Classification Search
    USPC ........................................................ 318/437
    See application file for complete search history.

(56) References Cited

U.S. PATENT DOCUMENTS

2003/0210006 A1    11/2003    Kusaka
2011/0130996 A1*    6/2011    Blind ................... H02P 25/024
                                                      702/94

FOREIGN PATENT DOCUMENTS

| CN | 102017391 A | 4/2011 |
|---|---|---|
| CN | 102148603 A | 8/2011 |
| CN | 102282753 A | 12/2011 |
| DE | 19711463 | 9/1998 |
| DE | 102008001408 | 10/2009 |
| DE | 102009029396 | 3/2011 |
| DE | 102009055141 | 6/2011 |

* cited by examiner

CALIBRATION AND MONITORING OF AN ANGLE MEASURING SYSTEM FOR ELECTRICAL MACHINES

FIELD OF THE INVENTION

The present invention relates to an electrical machine having an angle measuring system.

BACKGROUND INFORMATION

German Published Patent Appln. No. 10 2009 029 396 relates to a method for operating an electrical machine, in which method the electrical machine has a stator and a rotor, and the angular position of the rotor with respect to the stator is identified using a resolver principle. The basis of the resolver principle is that a magnetic field is created inside the electrical machine by way of a coil, i.e. either the rotor winding or the stator winding. This magnetic field induces, in the respective other winding, a voltage whose parameters depend on the angular position of the rotor with respect to the stator. If this induced voltage is evaluated, the angular position can consequently be deduced with no need for the electrical machine to have an additional sensor.

SUMMARY

An object upon which the invention is based is that of increasing the reliability of an angle measurement.

The present invention is based on the recognition that the measurement of an angular position transducer can be checked by way of an angle measurement based on the pole wheel voltage.

According to one aspect, the object according to the present invention is achieved by an electrical machine having an angular position transducer for identifying a first rotation angle of a rotor, a stator winding for generating a magnetic field, a voltage measuring instrument for sensing a pole wheel voltage at the ends of the stator winding upon a rotation of the rotor, and an identification circuit for identifying a second rotation angle from the pole wheel voltage and for identifying an angle difference between the first and the second rotation angle. The result thereof is to achieve, for example, the technical advantage that a plausibilization of the angle signal can be carried out regularly even during operation in the vehicle, so that any changes caused, for example, by skewing, an influence of outside objects, or demagnetization can be detected. A particular advantage achieved is that the zero position of the angle signal is identified in simple and economical fashion, and both initial programming and subsequent checking of the angle signal are enabled.

In an advantageous embodiment, the electrical machine encompasses a nonvolatile memory for storing the angle difference. The result thereof is to achieve, for example, the technical advantage that the angle difference is permanently available for correction of a rotation angle.

In a further advantageous embodiment, the electrical machine encompasses an exciter winding on the rotor and a current limiter for limiting a maximum exciter current in the exciter winding. The result thereof is to achieve, for example, the technical advantage that the pole wheel voltage that is generated can be set via the current limiter.

In a further advantageous embodiment, the current limiter is embodied to set the pole wheel voltage as a function of rotation speed, by setting the maximum exciter current below a reference voltage. The result thereof is to achieve, for example, the technical advantage that an exceedance of the reference voltage, for example a vehicle electrical system voltage, is prevented, and there is no flow of current that modifies the phase of the voltage signal as a result of stator inductance.

In a further advantageous embodiment, the electrical machine encompasses a comparator for comparing the pole wheel voltage with a reference voltage in order to generate a comparison signal. The result thereof is to achieve, for example, the technical advantage that an angle calibration can be carried out as a function of the comparison signal obtained.

In a further advantageous embodiment, the comparator is embodied to output the comparison signal as soon as the pole wheel voltage falls below the reference voltage. The result thereof is to achieve, for example, the technical advantage that a signal is outputted when no current that modifies the phase of the pole wheel voltage is flowing.

In a further advantageous embodiment, the identification circuit is embodied to identify the angle difference when the comparison signal is present. The result thereof is to achieve, for example, the technical advantage that the angle calibration can be carried out particularly exactly.

In a further advantageous embodiment, the identification circuit is embodied to correct the first rotation angle by an amount equal to the angle difference in order to obtain a corrected rotation angle. The result thereof is to achieve, for example, the technical advantage that a rotation angle that reliably reflects the position of the rotor is obtained.

In a further advantageous embodiment, the identification circuit is embodied to compare the corrected rotation angle with the second rotation angle. The result thereof is to achieve, for example, the technical advantage that the reliability of the angle measurement is increased.

In a further advantageous embodiment, the identification circuit is embodied to output a fault signal if the corrected rotation angle and the second rotation angle deviate from one another. The result thereof is to achieve, for example, the technical advantage that incorrect operation of the electrical machine is prevented.

In a further advantageous embodiment, the electrical machine encompasses a control application apparatus for generating a rotating field synchronously with the corrected first rotation angle. The result thereof is to achieve, for example, the technical advantage that particularly precise application of control to the rotor is achieved.

In a further advantageous embodiment, the number of magnetic pole pairs of the electrical machine is greater than one. The result thereof is to achieve, for example, the technical advantage that the accuracy of a calibration increases.

According to a further aspect, the object according to the present invention is achieved by a method for operating an electrical machine having the steps of sensing a first rotation angle of a rotor of the electrical machine by way of an angular position transducer, sensing a pole wheel voltage at the ends of a stator winding upon a rotation of the rotor, identifying a second rotation angle from the pole wheel voltage, and identifying an angle difference between the first and the second rotation angle. The same advantages as those resulting from the electrical machine according to the first aspect can thereby be achieved.

In an advantageous embodiment, the method encompasses the step of storing the angle difference in a control application electronic system. The result thereof is to achieve, for example, the technical advantage that the angle difference that has been identified is available for any further data processing steps.

In an advantageous embodiment, the method encompasses the step of ascertaining the angle difference at multiple positions along the rotor periphery. The result thereof is to achieve the advantage that the angle difference is ascertained at more than one position along the rotor periphery, and the correction of the rotation angle along the rotor periphery varies. Ascertaining a plurality of correction values further improves the dependability of the method.

In an advantageous embodiment, the method encompasses the step of correcting the first rotation angle by an amount equal to the angle difference in order to obtain a corrected rotation angle. The result thereof is once again to achieve, for example, the technical advantage that a more accurate and more precise rotation angle is obtained.

In an advantageous embodiment, the method encompasses the step of generating a rotating field synchronously with the corrected first rotation angle. The result thereof is once again to achieve, for example, the technical advantage that control is precisely applied to the rotor of the electrical machine.

DETAILED DESCRIPTION

The present invention can be used, for example, with generators for converting mechanical energy into electrical energy in motor vehicles. These are usually made up of claw pole generators that are equipped with an electrical excitation system. Because claw pole generators generate rotary current usually having three phases, the voltage that is generated is rectified for the usual motor vehicle DC voltage system, for example using rectifiers based on semiconductor diodes.

Generators that can additionally be used to start an internal combustion engine, also called "starter generators," additionally exist. A starter generator of this kind as a rule is operated in motor mode only at very low rotation speeds, since the torque that can be generated quickly decreases at higher rotation speed.

Further generators that can also be used for motor vehicle drive purposes are known from the hybrid vehicle sector. These generators assist the internal combustion engine at low rotation speeds at which the latter is not yet supplying its full torque (boost mode, turbo lag compensation). In drive systems of this kind, an angular position transducer is used in motor mode in order to generate an angle-synchronous rotating field in a stator winding.

In order to align the angular position transducer, one phase of the generator can be energized.

The result is that the rotor orients itself in a specific position that is detected as a zero position. The reproducibility of such an alignment is low, however, due to frictional effects or external torques, and the method is usable during operation only with difficulty, i.e. only at a standstill and with no external torque. In addition, the method causes a power loss and loads one phase asymmetrically.

Figure 1:
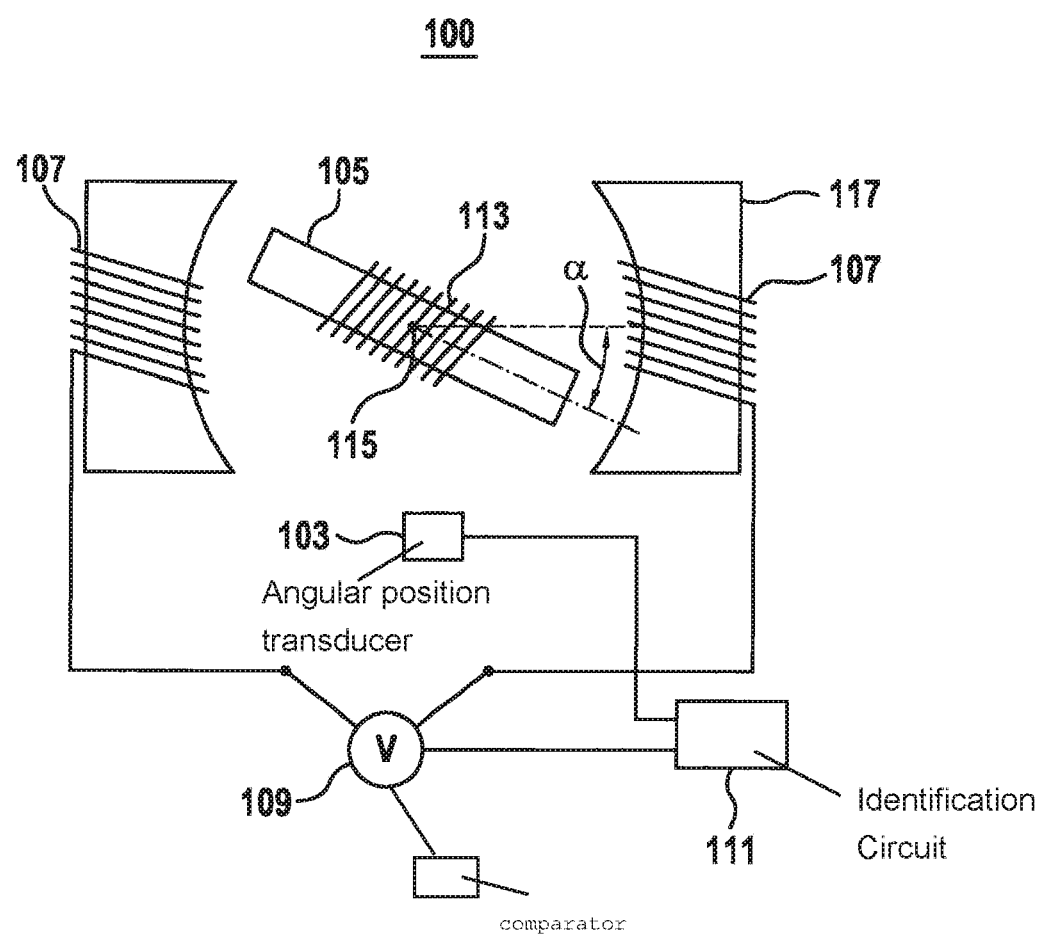
FIG. 1 is a schematic view of an electrical machine.

FIG. 1 is a schematic view of electrical machine 100 according to the present invention. Electrical machine 100 encompasses a rotor 105 that is mounted rotatably around a rotation axis 115. Rotor 105 encompasses exciter winding 113. Rotor 105, also called a "rotating body" or "armature," is part of a machine that functions electromagnetically, and forms the movable part of the electrical machine.

Exciter coil 113 is a coil of wire windings that generates the magnetic field for energy conversion, also called the "main field" or "air gap field," when an electrical current flows through it. This current is called an "excitation current."

The electrical machine further encompasses a stator or stationary body 117. Stator 117 constitutes the stationary part of electrical machine 100. In many cases, stator 117 also constitutes the housing of electrical machine 100, and in electric motors and generators it is made of sheet steel or cast metal. Stator 117 serves as the core and carrier of stator winding 107.

When electrical machine 100 is in operation, stator winding 107 generates a rotating field that couples to the magnetic field of the exciter winding in such a way that rotor 105 is caused to rotate. In the generator mode of electrical machine 100, electrical energy is fed via stator winding 107 into a connected electrical system, while in motor mode electrical energy is withdrawn from that system.

In order to sense an angle of rotor 105, electrical machine 100 encompasses an angular position transducer 103. Angular position transducer 103 is a sensor for sensing the present position of rotor 105 so that an angle-synchronous rotating field can be generated in stator winding 107. A giant magnetoresistive (GMR) sensor or an incremental transducer can be used, for example, as angular position transducers that sense changes in the angle of the rotor.

The zero position of the angle signal generated by the sensor depends on installation tolerances. The signals of the sensor can furthermore be distorted by magnetic fields in the vicinity of the sensor.

It is therefore advantageous to calibrate the absolute position of angular position transducer 103 once, and to store it in the control application software. It is further advantageous to be able to carry out at regular intervals, even during operation, for example during operation in a motor vehicle, a plausibilization of the angle signal that is obtained, in order to detect any error sources resulting, for example, from skewing, the influence of external objects, or demagnetization.

A voltage measuring instrument 109 is therefore connected to the ends of stator winding 107. As soon as rotor 105 is rotating and a current is flowing through exciter winding 113, a voltage (also called a "pole wheel voltage") is induced in the stator winding. Voltage measuring instrument 109 senses the induced pole wheel voltage. In accordance with the present invention, the pole wheel voltage is therefore used to align the angular position. The pole wheel voltage can be set in relation to the angle signal of the angular position transducer. For this purpose, electrical machine 100 encompasses an identification circuit 111. The identification circuit can process the signals of angular position transducer 103 and of voltage measuring instrument 109, and calculate a phase shift or an angle difference between the two signals. Identification circuit 111 can be constituted, for example, by a control device having a central computation unit (CPU).

Figure 2:
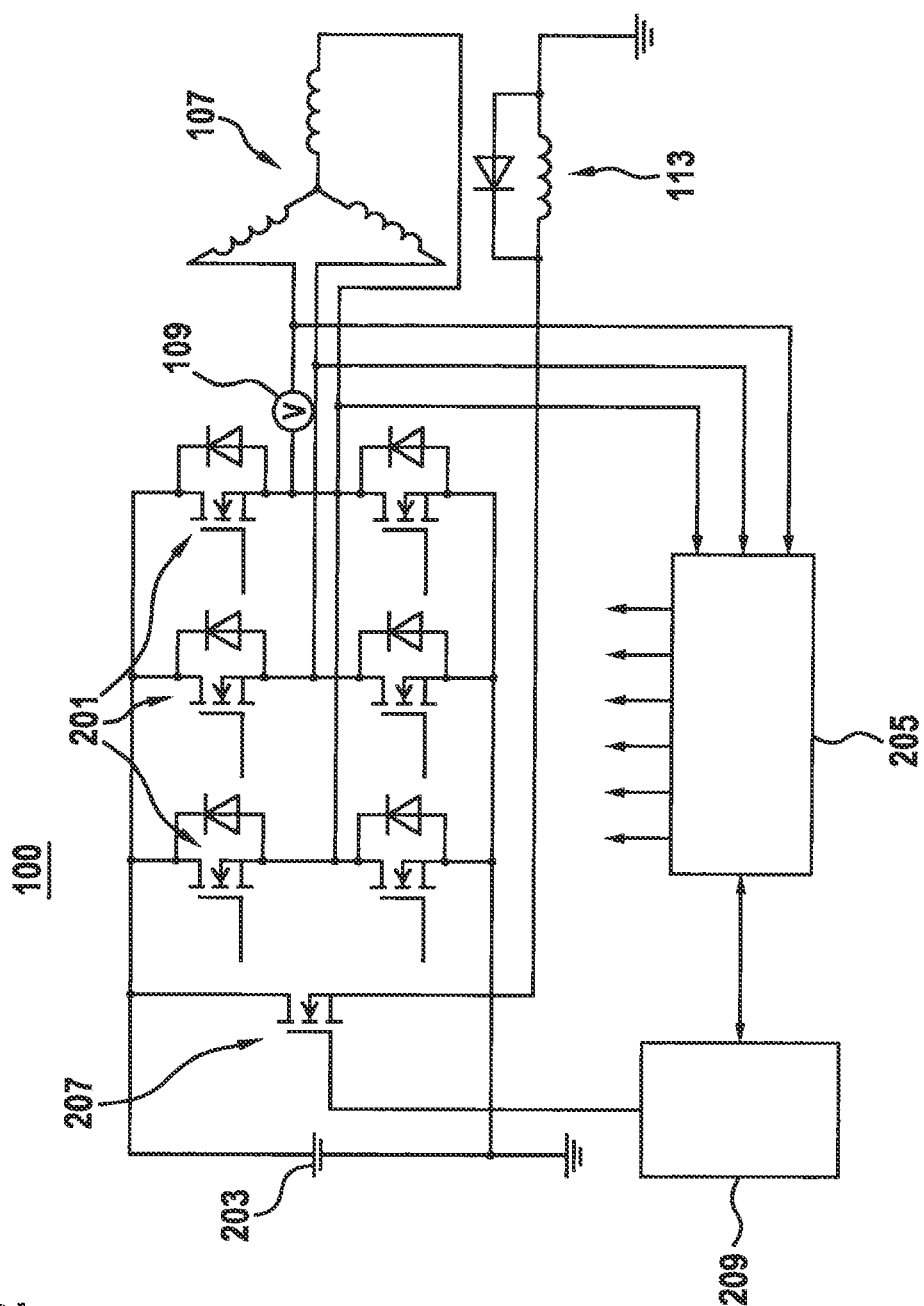
FIG. 2 shows a circuit for an electrical machine.

FIG. 2 is a circuit diagram of a three-phase electrical machine 100.

Switching elements 201, for example MOSFETs, are connected via busbars on the one hand to stator winding 107 and on the other hand to DC voltage terminals of the starter generator. The DC voltage terminals of the starter generator are in turn connected to a battery of the motor vehicle. In contrast to a voltage of 12 V as in usual batteries utilized in motor vehicles, this battery can also have other voltages such as 48 V. The gate terminals of the MOSFETs are connected to a control application logic system 205 that encompasses identification circuit 111. The switch-on and switch-off times of the individual MOSFETs are identified by evaluating the position of rotor 105.

Exciter winding 113 is switched on and off in a manner timed by a power switch 207, so that the current delivered to exciter winding 113 can be controlled and limited. Control is applied to power switch 207 by way of a field controller 209. The exciter current can be regulated by conventional two-point control. At the terminals of stator winding 107, at least one phase voltage is measured by voltage measuring device 109.

Figure 3:
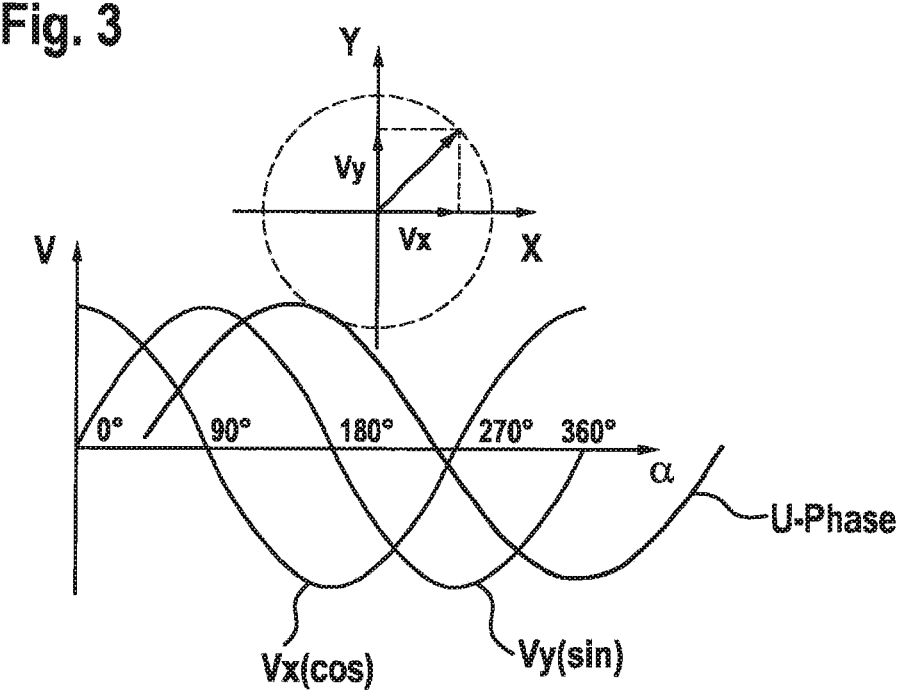
FIG. 3 is a diagram of a change over time in an angle sensor signal and in a pole wheel voltage, for a machine having one pole pair.

FIG. 3 shows the signals Vy(sin) and Vx(cos) returned by the angular position transducer or rotor position sensor 103, and the voltage U-Phase sensed by the voltage measuring device at the stator winding, for an electrical machine having a pole pair number of 1. The signals of angular position transducer 103 are two sine-wave signals offset 90 degrees from one another, from which a first rotation angle of the rotor can be calculated via an arctangent calculation. The zero position of this angle signal depends on the installation position of the sensor magnet, which as a rule does not correspond to the orientation of the rotor field generated by the exciter coil. For a larger number of pole pairs, the frequency of the measured phase voltage increases accordingly.

Upon rotation of rotor 105, this magnetic field induces in stator windings 107 an approximately sinusoidal voltage U-Phase (the so-called "pole wheel voltage") that can be measured at the winding ends of stator winding 107 as long as no current is flowing in the stator winding. This voltage U-Phase is used to calibrate the angular position by identifying a second rotation angle. The machine can be operated for that purpose at a constant rotation speed. It is not necessary, however, for the rotation speed to have a defined value.

The magnitude of the exciter current is set, as a function of rotation speed, in such a way that the pole wheel voltage U-Phase that is measured at the phase point does not exceed a voltage of the vehicle electrical system, since if the voltage of the vehicle electrical system were exceeded at stator windings 107, a current would flow that, as a result of the stator inductance, would modify the phase of the voltage signal U-Phase.

A defined exciter current is therefore set in exciter winding 113. The values for the rotation speed and the exciter current of exciter winding 113 are selected in such a way that electrical machine 100 is operated at a rotation speed just below the onset of generator mode, and no current is yet being delivered into the connected vehicle electrical system.

If the pole wheel voltage U-Phase and the angle signal Vy(sin) and Vx(cos) generated by the angle sensor are then measured, the phase shift of the signals, and thus a correction angle between the first and the second angle, can then be identified. This correction angle represents a zero offset.

The zero offset is stored in suitable form in a nonvolatile memory of the control application software of electrical machine 100. Preferably the rotation speed and exciter current of the rotor are selected so that a plausibilization of the first and the second rotation angle can be performed in the vehicle at idle rotation speed. For this, for example, the first rotation angle can be corrected by an amount equal to the correction angle and can then be compared with the second rotation angle. If the corrected first rotation angle and the second rotation angle deviate from one another, a fault signal can be outputted.

Figure 4:
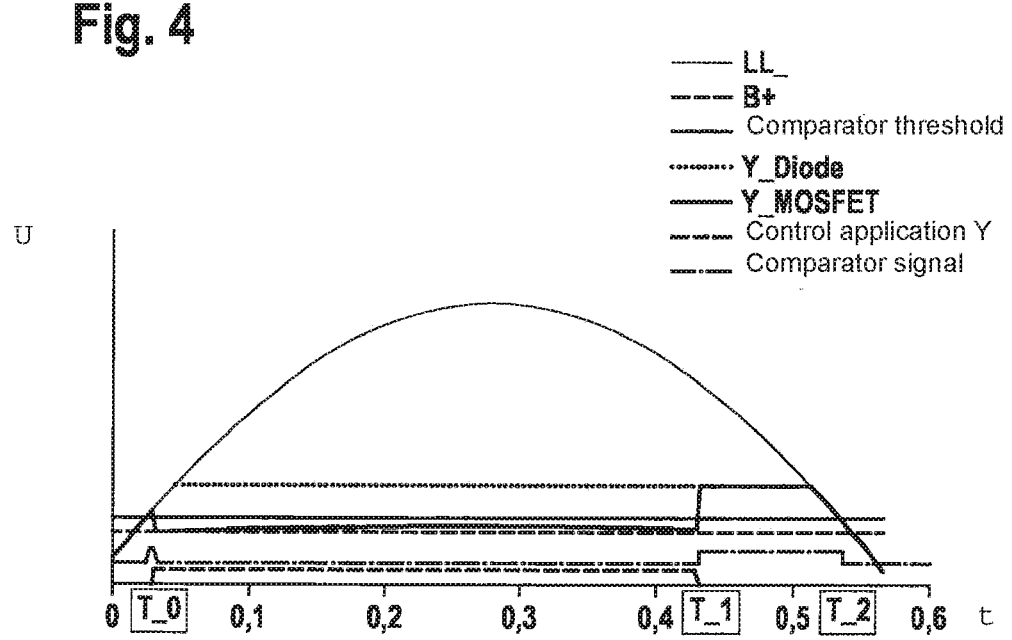
FIG. 4 shows the output voltages when a comparator system is used.

FIG. 4 shows a comparator system that can be used to regulate active rectifiers. The comparator system generates a signal as soon as the phase voltage LL exceeds the vehicle electrical system voltage B+. This comparator signal can be used for rotor position calibration.

The phase voltage U-Phase can be identified, for example, by receiving the phase voltage via an analog-digital converter (ADC) input, followed by evaluation of the zero crossings or maximum and minimum values of the signal. The phase signal can also be evaluated by way of the comparator signal and by subsequently ascertaining the phase shift.

In another embodiment the exciter current can be selected in such a way that a minimal generator current is delivered into the vehicle electrical system, i.e. the pole wheel voltage is minimally higher than the vehicle electrical system voltage B+. In this case the comparator signals that are also used for active rectification can be used to sense the phase position.

In FIG. 4, the vertical axis is U voltage, and the horizontal axis is t time. FIG. 4 shows phase voltage LL, vehicle electrical system voltage B+, Comparator threshold, Y_Diode, Y_MOSFET, Control Application Y, and comparator signal.

The method can be used with a variety of angle sensing systems as angular position transducers, for example an incremental transducer. In general, the subject matters explained in the description and in the Figures do not limit the range of protection of the invention. All features shown and described can be appropriately combined with one another in any manner in order to achieve their advantageous effects simultaneously.

In general the method according to the present invention can also be used in electrical machines having a number of magnetic pole pairs that is greater than 1.

Figure 5:
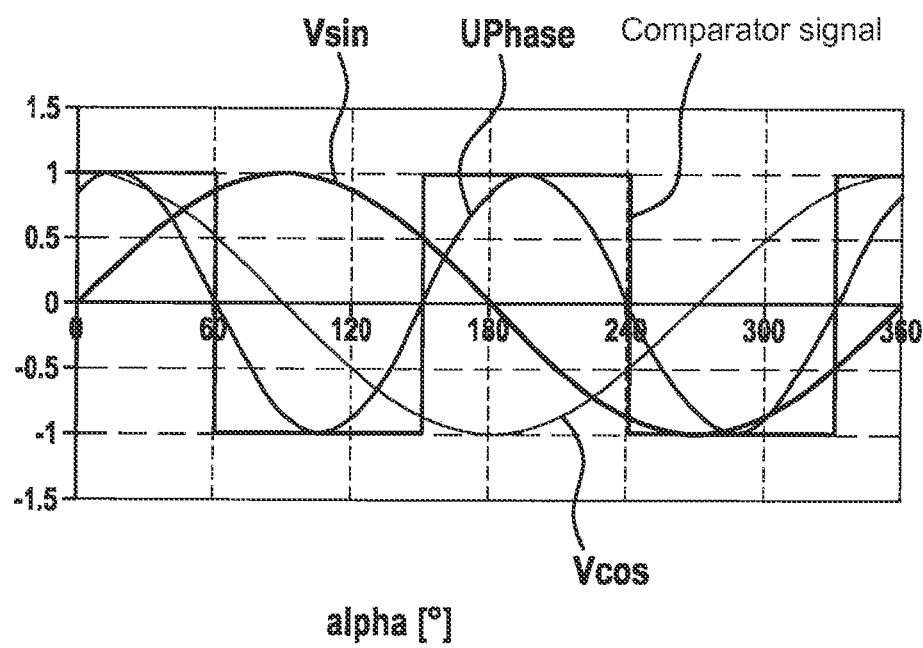
FIG. 5 is a diagram of a change over time in signals for an angle sensor and a phase voltage, for a machine having two pole pairs.

FIG. 5 shows the signal curves for an angle sensor and a phase voltage for an electrical machine having two pole pairs. Because the phase voltage has twice the frequency, the evaluation yields two different zero offset values, since two zero crossings (e.g. at 150° and 330°) can be evaluated within one mechanical revolution. A digital signal can be generated by way of a comparator circuit so that the switching edges can be evaluated for offset compensation.

In an ideally symmetrically constructed rotor, the two zero offset values have a difference of (360° divided by the number of pole pairs). If this offset value in terms of one mechanical revolution is recalculated for the electrical frequency of the phase voltage, the same value is produced at each zero crossing. Rotor position compensation can then be performed as described.

If different offset values are produced, for example if the rotor construction is not exactly symmetrical due to manufacturing tolerances, in this case the method offers the additional capability of compensating for this asymmetry by way of an angle-dependent characteristic curve. In the present case this characteristic curve has two interpolation points, i.e. the two differently ascertained offset values, between which a linear interpolation can be effected. The greater the number of pole pairs in the machine, the more accurate this characteristic curve becomes. A pole pair number of eight, for example, results in a characteristic curve having eight interpolation points.

In addition, multiple phase voltages of the electrical machine can also be used to identify an offset value, thus yielding additional interpolation points. A three-phase machine having a pole pair number of eight, for example, thus yields 24 interpolation points.

LIST OF REFERENCE CHARACTERS

100 Electrical machine
103 Angular position transducer
105 Rotor
107 Stator winding
109 Voltage measuring instrument
111 Identification circuit
113 Exciter winding
115 Rotation axis
117 Stator
201 Switching elements
203 Battery
205 Control application logic system
207 Power switch
209 Field regulator
U-Phase Pole wheel voltage
Vx(cos) Angular position transducer signal
Vy(sin) Angular position transducer signal
B+ Vehicle electrical system voltage
α Rotor angle

What is claimed is:

1. An electrical machine, comprising:
    an angular position transducer for identifying a first rotation angle of a rotor;
    an exciter winding of the rotor, through which winding an exciter current flows;
    a stator winding for generating a magnetic field;
    a voltage measuring instrument for sensing a pole wheel voltage at ends of the stator winding upon a rotation of the rotor;
    an identification circuit for identifying a second rotation angle from the pole wheel voltage and for identifying an angle difference between the first rotation angle and the second rotation angle; and
    a comparator for comparing the pole wheel voltage with a reference voltage in order to generate a comparison signal;
    wherein the exciter current is selected in such a way that the pole wheel voltage does not exceed a vehicle electrical system voltage;
    wherein the comparator outputs the comparison signal as soon as the pole wheel voltage falls below the reference voltage; and
    wherein the identification circuit identifies the angle difference when the comparison signal is present.

2. The electrical machine as recited in claim 1, further comprising a memory for storing the angle difference.

3. The electrical machine as recited in claim 1, further comprising a current limiter for limiting a maximum exciter current in the exciter winding.

4. The electrical machine as recited in claim 3, wherein the current limiter sets the pole wheel voltage by setting a maximum exciter current below a reference voltage.

5. The electrical machine as recited in claim 1, wherein the identification circuit corrects the first rotation angle by an amount equal to the angle difference in order to obtain a corrected rotation angle.

6. The electrical machine as recited in claim 5, wherein the identification circuit compares the corrected rotation angle with the second rotation angle.

7. The electrical machine as recited in claim 6, wherein the identification circuit outputs a fault signal if the corrected rotation angle and the second rotation angle deviate from one another.

8. The electrical machine as recited in claim 5, further comprising a control application apparatus for generating a rotating field synchronously with the corrected rotation angle.

9. The electrical machine as recited in claim 1, wherein a number of magnetic pole pairs is greater than one.

10. A method for operating an electrical machine, comprising:
    sensing a first rotation angle of a rotor of the electrical machine by way of an angular position transducer;
    sensing a pole wheel voltage at ends of a stator winding upon a rotation of the rotor;
    identifying a second rotation angle from the pole wheel voltage;
    comparing, using a comparator, the pole wheel voltage with a reference voltage in order to generate a comparison signal, wherein the comparator outputs the comparison signal as soon as the pole wheel voltage falls below the reference voltage;
    identifying an angle difference between the first rotation angle and the second rotation angle, an identification circuit identifying the angle difference when the comparison signal is present; and
    selecting an exciter current that flows through an exciter winding of the rotor in such a way that the pole wheel voltage does not exceed a vehicle electrical system voltage.

11. The method as recited in claim 10, further comprising ascertaining the angle difference at multiple positions along a rotor periphery.

12. The method as recited in claim 10, further comprising correcting the first rotation angle by an amount equal to the angle difference in order to obtain a corrected rotation angle.

13. The method as recited in claim 12, further comprising generating a rotating field synchronously with the corrected first rotation angle.

* * * * *